(12) United States Patent
Akiba

(10) Patent No.: US 7,376,853 B2
(45) Date of Patent: May 20, 2008

(54) NETWORK APPARATUS, METHOD FOR CONTROLLING THE SAME, AND PROGRAM FOR THE SAME

(75) Inventor: Tomohiro Akiba, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 11/076,476

(22) Filed: Mar. 9, 2005

(65) Prior Publication Data

US 2005/0204189 A1    Sep. 15, 2005

(30) Foreign Application Priority Data

Mar. 15, 2004    (JP) ............................. 2004-072702

(51) Int. Cl.
*G06F 1/26*    (2006.01)
(52) U.S. Cl. ...................... 713/324; 713/300; 713/310
(58) Field of Classification Search ................ 713/300, 713/310, 324
See application file for complete search history.

(56) References Cited

U.S. PATENT DOCUMENTS

| | | | | |
|---|---|---|---|---|
| 5,560,021 A | * | 9/1996 | Vook et al. ................. | 713/323 |
| 5,708,821 A | * | 1/1998 | Takikita ...................... | 713/310 |
| 2004/0004732 A1 | | 1/2004 | Takeda | |

FOREIGN PATENT DOCUMENTS

| | | |
|---|---|---|
| JP | 11-110089 A | 4/1999 |
| JP | 2000-261515 A | 9/2000 |

\* cited by examiner

*Primary Examiner*—Rehana Perveen
*Assistant Examiner*—Eric Chang
(74) *Attorney, Agent, or Firm*—Canon U.S.A., Inc., IP Division

(57) ABSTRACT

A network apparatus and a method for controlling the apparatus where the apparatus is connected to a communication network and is capable of switching between a first operation mode and a second operation mode for receiving data from the communication network. The network apparatus includes a data processing device operating in the first operation mode and data input processing device operating in the first and second operation mode. The data processing device includes a first storage unit for storing data and first controlling unit for controlling the data processing device and converting the data. The data input processing device includes a second storage unit for storing the data, a second controlling unit for controlling the data input processing device, and a communication unit for receiving data from the communication network, storing the data in the first storage unit in the first operation mode, and storing the data in the second storage unit when switching from the first operation mode to the second operation mode or in the second operation mode.

10 Claims, 8 Drawing Sheets

NETWORK APPARATUS, METHOD FOR CONTROLLING THE SAME, AND PROGRAM FOR THE SAME

BACKGROUND OF THE INVENTION

1. Field of the Invention

The present invention relates to a network apparatus having network functions and, more specifically, relates to a network apparatus, a method for controlling the network apparatus, and a program, wherein the network apparatus is capable of switching between buffers for sleep operation and buffers for normal operation.

2. Description of the Related Art

Recently, there has been a demand for reducing the stand-by power required while an apparatus is not in operation (i.e., while the apparatus is in a 'sleep mode'. Some known apparatuses are capable of reducing the required stand-by power by using two separate control units, wherein a CPU or a controller is used for carrying out the processing required for sleep operation and a main CPU is used for carrying out processing required for normal operation. The power supply to the main CPU is terminated while the apparatus is in a sleep mode (refer to Japanese Patent Laid-Open No. 2000-261515).

By distributing the processing required for such an apparatus between two control units, the processing related to input received from the outside (i.e., the so-called input/output processing) may be carried out by one of the controller units (or CPU). In this way, while in a sleep mode, only the CPU for input/output (I/O CPU) (or controller) will be in operation. However, when there is an input from the outside while in a sleep mode, the apparatus will drive the main CPU required for normal operation so as to return from sleep operation mode to normal operation mode (refer to Japanese Patent Laid-Open No. 11-110089).

When processing required for an apparatus is distributed between two control units, the CPU used as the main CPU should be capable of high-speed processing. Consequently, a high-speed memory is required for the high-speed CPU. Such a high-speed CPU and a high-speed memory consume a large amount of power. However, power consumption of the apparatus in sleep operation can be reduced by stopping the power supply to the main CPU and its memory.

On the other hand, the CPU used as the I/O CPU only needs to be able to carry out minimum processing required for sleep operation. The memory required for such an I/O CPU is often low capacity, low-speed, and low power-consuming.

Network processing for an apparatus having the above-described CPU structure will now be described. Network processing for such an apparatus must be carried out at high speed and requires a relatively high level of CPU power. Since the apparatus must be accessible from a network, it must be operable at all times, including while in a sleep mode.

To satisfy the above-mentioned conditions, the apparatus carries out packet processing with the main CPU and the memory for the main CPU in normal operation, and switches to the I/O CPU in sleep operation. Then, when a predetermined action is carried out or a predetermined packet is received, the apparatus switches back from the I/O CPU to the main CPU to return to normal operation (refer to Japanese Patent Laid-Open No. 2004-34488).

To realize this structure, the apparatus is usually capable of switching buffer regions for storing packets received by a network adapter (also known as a network controller or a local area network (LAN) controller). More specifically, the apparatus stores the packets in the memory for the main CPU while in a normal operation mode, and stores the packets in the memory for the I/O CPU while in a sleep mode.

Although an apparatus using a network controller may be able to switch between two types of buffers for sleep and normal operation, as described above, it is extremely difficult to provide an apparatus that is capable of switching between a sleep mode and a normal operation mode without failing to receive any packets and at the same time, is capable of carrying out high-speed network processing in normal operation and is accessible from a network in sleep operation. From this point of view, known network apparatuses require further improvement.

The present invention has taken into consideration the above-mentioned problems and provides a network apparatus that is capable of switching between two types of buffers for sleep operation and normal operation and capable of receiving packets without failure, and also provides a method for controlling the network apparatus.

SUMMARY OF THE INVENTION

The present invention provides a network apparatus connected to a communication network and capable of switching between a first operation mode (normal operation mode) and a second operation mode (sleep operation mode) for receiving data from the communication network, the network apparatus comprising a data processing device (100) operating in the first operation mode and a data input processing device (200) operating in the first and the second operation modes. The data processing device (100) includes a first storage unit (1003-0 to 1003-n) for storing the data and a first controlling unit (105, 101, and 102) for controlling the data processing device and converting the data. The data input processing device (200) includes a second storage unit (1004-0 to 1004-n) for storing the data, a second controlling unit (206 and 201) for controlling the data input processing device, and a communication unit (203) for receiving data from the communication network, storing the data in the first storage unit in the first operation mode, and storing the data in the second storage unit when switching from the first operation mode to the second operation mode or in the second operation mode. Both the first and second controlling unit cancels the switching from the first operation mode to the second operation mode if data is stored in the first or second storage unit while the first operation mode is being switched to the second operation mode (remaining-processing mode 1101 (this mode is the condition which the CPU is processing the remaining packets in the storage unit)→normal operation mode 1103, remaining-processing mode 1201→normal operation mode 1203, sleep-preparation completion mode 1105 (this mode is the condition in which preparation for entering to sleep operation mode has completed)→return-waiting mode 1107 (this mode is the condition which is waiting trigger for returning to normal operation mode), sleep-preparation completion mode 1205→return-waiting mode 1207), and the first controlling unit converts the data stored in the first or second storage unit (Step 1418 and the loop processing in Steps 1413 and 1414).

The present invention provides a method for controlling a network apparatus connected to a communication network and capable of switching between a first operation mode and a second operation mode for receiving data from the communication network. The network apparatus comprises a data processing device operating in the first operation mode and a data input processing device operating in the first and the second operation modes. The data processing device includes a first storage unit for storing the data and a first controlling unit for controlling the data processing device and converting the data. The data input processing device includes a second storage unit for storing the data, a second controlling unit for controlling the data input processing device, and a communication unit for receiving data from the communication network, storing the data in the first storage unit in the first operation mode, and storing the data in the second storage unit when switching from the first operation mode to the second operation mode or in the second operation mode.

The method for controlling the network apparatus comprises: a first switching step (Steps 1401 and 1402) of detecting the switching from the first operation mode to the second operation mode, starting the switching from the first operation mode to the second operation mode, and sending an instruction to the second controlling unit to switch the first operation mode to the second operation mode, the first switching step being carried out by the first controlling unit; a second switching step (Step 1601→Step 1603) of receiving the instruction sent in the first switching step and start switching from the first operation mode to the second operation mode, the second switching step being carried out by the second controlling unit; a determining step (Step 1504→Step 1506 and Step 1606) of determining whether the data received by the network apparatus is stored in the first or second storage unit while the first operation mode is being switched to the second operation mode, the determining step being carried out by the second controlling unit; a notifying step (Step 1509 and Step 1607 →Step 1608) of sending a cancellation notification that the switching from the first operation mode to the second operation mode has been cancelled if the second controlling unit determines that the data received by the network apparatus is stored in the first or second storage unit in the determining step, the notifying step being carried out by the second controlling unit; a first canceling step (Steps 1510 and 1511) of canceling the switching from the first operation mode to the second operation mode if the second controlling unit determines that the data received by the network apparatus is stored in the first or second storage unit in the determining step, the first canceling step being carried out by the second controlling unit; a receiving step (Step 1404→Step 1417 and Step 1409→Step 1410) of receiving the cancellation notification that the switching from the first operation mode to the second operation mode has been cancelled sent in the notifying step, the receiving step being carried out by the first controlling unit; a second canceling step (Steps 1417 and 1412) of canceling the switching from the first operation mode to the second operation mode if the first controlling unit receives the cancellation in the receiving step, the second canceling step being carried out by the first controlling unit; and a stored-data processing step (Step 1418 and Step 1413→Step 1414) of converting the data received by the network apparatus stored in the first or second storage unit in accordance with the cancellation notification of the switching from the first operation mode to the second operation mode received in the second canceling step, the stored-data processing step being carried out by the first controlling unit.

The present invention provides a program to be executed by a computer to realize the steps of the method for controlling the network apparatus.

The present invention provides a network apparatus connected to a communication network and capable of switching between a first operation mode and a second operation mode for receiving data from the communication network, the network apparatus comprising a data processing device operating in the first operation mode and a data input processing device operating in the first and the second operation modes. The data processing device includes a first storage unit for storing the data and a first controlling unit for controlling the data processing device and converting the data. The data input processing device includes a second storage unit for storing the data, a second controlling unit for controlling the data input processing device, and a communication unit for receiving data from the communication network, storing the data in the first storage unit in the first operation mode, and storing the data in the second storage unit when switching from the first operation mode to the second operation mode or in the second operation mode.

The present invention provides a method for controlling a network apparatus connected to a communication network and capable of switching between a first operation mode and a second operation mode for receiving data from the communication network, the network apparatus comprising a data processing device operating in the first operation mode and a data input processing device operating in the first and the second operation modes. The data processing device includes a first storage unit for storing the data and a first controlling unit for controlling the data processing device and converting the data. The data input processing device includes a second storage unit for storing the data, a second controlling unit for controlling the data input processing device, and a communication unit for receiving data from the communication network, storing the data in the first storage unit in the first operation mode, and storing the data in the second storage unit when switching from the first operation mode to the second operation mode or in the second operation mode. The method for controlling the network apparatus comprises: a first switching step of detecting the switching from the first operation mode to the second operation mode, starting the switching from the first operation mode to the second operation mode, and sending an instruction to the second controlling unit to switch the first operation mode to the second operation mode, the first switching step being carried out by the first controlling unit; and a second switching step of receiving the instruction sent in the first switching step and start switching from the first operation mode to the second operation mode, the second switching step being carried out by the second controlling unit.

In the description above, reference numerals corresponding to an embodiment of the present invention are indicated in parentheses. Although the reference numerals are indicated, the scope of the present invention is not limited to the components described in the embodiment of the present invention.

As described above, the present invention provides a system that is capable of receiving packets without failure even when the operation mode is changed by providing a network apparatus including a network controller capable of switching between buffers for sleep operation and normal operation. The network apparatus carries out a process for receiving packets without failure when entering a sleep mode. The network apparatus, in a normal operation mode, is capable of high-speed packet processing. The network apparatus, in a sleep mode, is prepared to receive data as it is in a normal operation mode.

Further features and advantages of the present invention will become apparent from the following description of exemplary embodiments (with reference to the attached drawings).

DESCRIPTION OF THE EMBODIMENTS

First Embodiment

Figure 1:
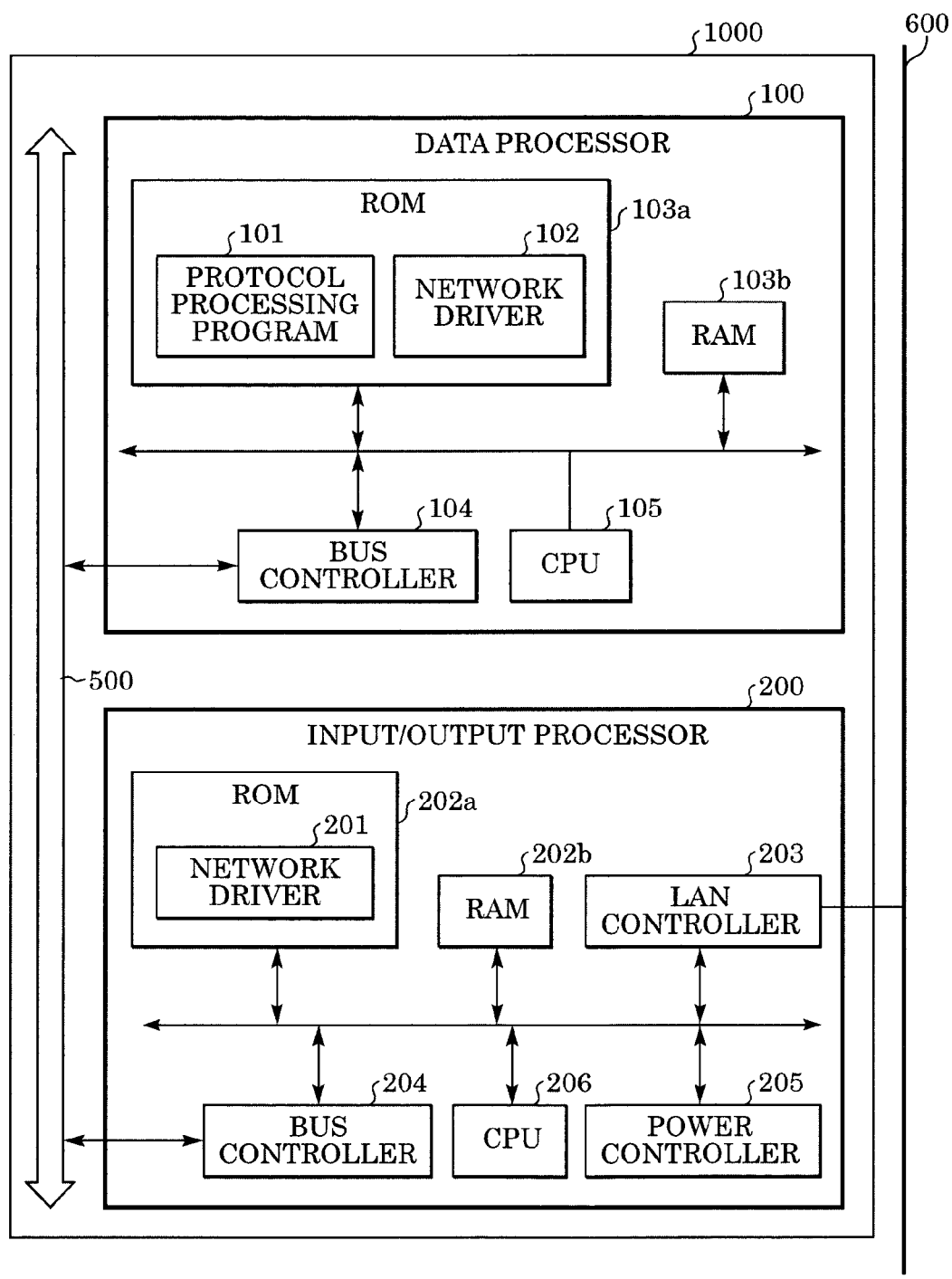
FIG. 1 is a block diagram of a network system according to an embodiment of the present invention.

The embodiments of the present invention will now be described with reference to the drawings. The same reference numerals indicate the same components in each drawing, and redundant descriptions of the components concerning each drawing are omitted.

FIG. 1 is a block diagram of a network system according to an embodiment of the present invention. The network system according to an embodiment of the present invention includes a network apparatus 1000 and a network 600 connected to the network apparatus 1000. The network 600 is a known communication network, such as a local area network (LAN). The network apparatus 1000 includes a data processing device 100, an input/output (I/O) processing device 200, and a bus 500, and is capable of switching between sleep operation and normal operation.

The bus 500, for example, is a peripheral component interconnect (PCI) bus, and functions as a data communication path to other devices included in the data processing device 100, the I/O processing device 200, and the network apparatus 1000.

The data processing device 100 includes a central processing unit (CPU) 105, a read only memory (ROM) 103a, a random access memory (RAM) 103b, and a bus controller 104. The CPU 105 controls the operation of the data processing device 100. The ROM 103a stores various control programs executed by the CPU 105 and arithmetic data. The ROM 103a, according to this embodiment, includes a protocol processing program 101 for analyzing the protocol of the transmitted and received network data and a network driver 102 for controlling the transmission and reception of packets. The RAM 103b is provided as a work area for buffers for operating the CPU 105, and as a region for storing data.

The protocol processing program 101 is a program for converting the transmitted and received data in accordance with the network protocol, such as Transmission Control Protocol (TCP), user datagram protocol (UDP) or Internet Protocol (IP), and for dividing and merging transmitted and received data. The CPU 105 executes the protocol processing program 101 to enable data communication with the application programs of the network apparatus 1000 and the network driver 102.

The network driver 102 is a program, executed by the CPU 105, for transmitting data processed by the protocol processing program 101 by controlling a LAN controller 203, and for transmitting the data received from the LAN controller 203 to the protocol processing program 101.

The bus controller 104 controls the bus 500, which is connected to the data processing device 100 and the I/O processing device 200, so as to enable communication between the data processing device 100 and the I/O processing device 200 and with other devices connected to the bus 500 and included in the network apparatus 1000.

The I/O processing device 200 includes a CPU 206, a ROM 202a, a RAM 202b, a bus controller 204, a power controller 205, and a LAN controller 203. The CPU 206 controls the operation of the I/O processing device 200. The ROM 202a stores various control programs executed by the CPU 206, and arithmetic data. The CPU 206, according to this embodiment, includes a network driver 201 for controlling the transmission and reception of packets. The RAM 202b is provided as a work area for buffers for operating the CPU 206, and as a region for storing data.

The network driver 201 is a program, executed by the CPU 206, for handling only data received from the LAN controller 203 and for transmitting the data received from the LAN controller 203 to the protocol processing program 101.

The bus controller 204 controls the bus 500, which is connected to the data processing device 100 and the I/O processing device 200, so as to enable communication between the data processing device 100 and the I/O processing device 200 and with other devices connected to the bus 500 and included in the network apparatus 1000.

The power controller 205 controls the power of the entire network apparatus 1000 and controls the power supply to the I/O processing device 200, the data processing device 100, and the bus 500. The power controller 205 stops the power supply to the data processing device 100 and the bus 500 during sleep operation.

The LAN controller 203 controls signals flowing through the network 600, transmits data stored on the RAMs 103b, 202b as signals through the network 600, and retrieves packets addressed to the LAN controller 203 from the signals flowing through the network 600. The LAN controller 203 is a network adapter (network controller) capable of switching between sleep operation buffers in the I/O processing device 200 and normal operation buffers in the data processing device 100. The LAN controller 203 carries out direct memory access (DMA) transfer so as to store data in the normal operation buffers in the data processing device 100. In this way, data can be transferred from the LAN controller 203 to the buffers in the data processing device 100 without burdening the CPU 105.

Figure 2:
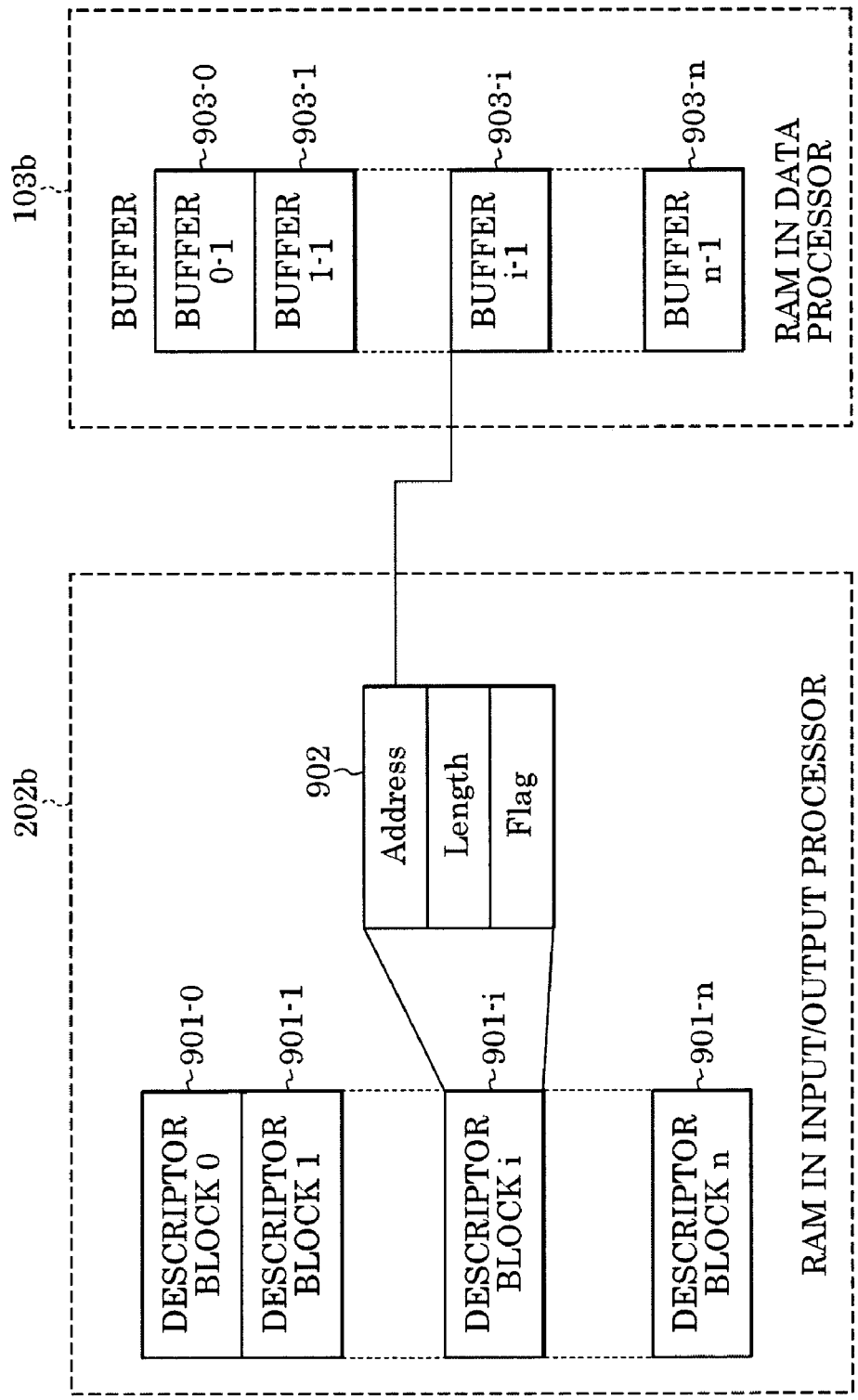
FIG. 2 is a schematic view of transmission buffers according to an embodiment of the present invention.
Figure 3:
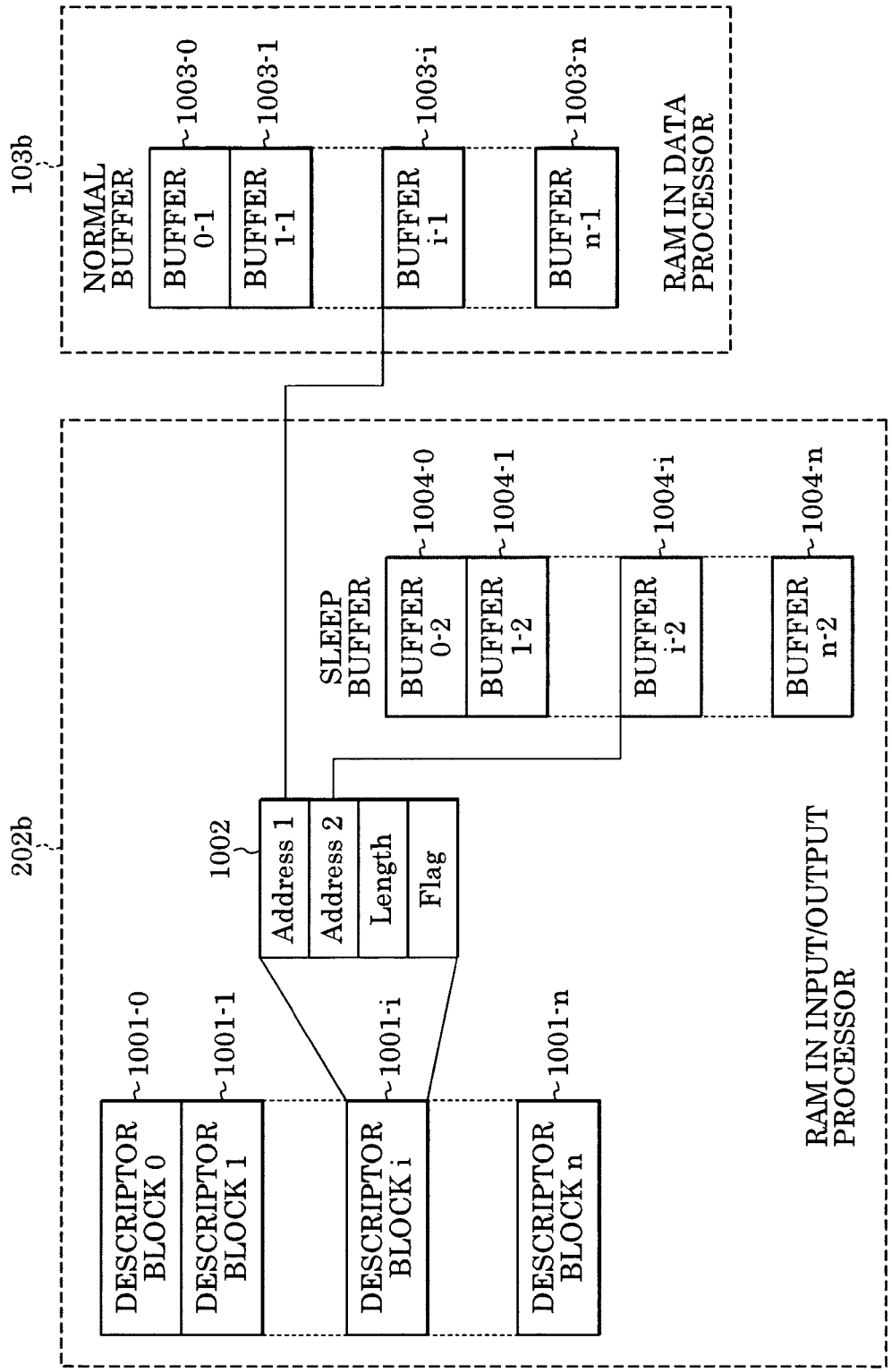
FIG. 3 is a schematic view of reception buffers according to an embodiment of the present invention.

Next, the operation of the network drivers 102 and 201 and the LAN controller 203 will be described with reference to FIGS. 2 and 3. FIG. 2 is a schematic view of the transmission buffers, and FIG. 3 is a schematic view of the reception buffers.

The transmission process of the network apparatus 1000 will now be described with reference to FIG. 2. The CPU 105 executes the protocol processing program 101 so as to generate a packet by converting and dividing the data sent from the application program of the network apparatus 1000. The CPU 105 stores the generated packet in one of transmission buffers 903-0 to 903-n (where n is a positive integer) in the RAM 103b in accordance with the processing of the network driver 102.

When storing the generated packet in a transmission buffer in the RAM 103b, the CPU 105 first requests the CPU 206 to refer to the descriptor blocks 901-0 to 901-n in the RAM 202b corresponding to the transmission buffers. The CPU 206 receives the request and refers to the flags of the internal data 902 of the descriptor blocks 901-0 to 901-n and searches for a descriptor block 901-i ($0 \leq i \leq n$) not storing any data. Here, an OFF flag indicates that no data is stored in the corresponding buffer and an ON flag indicates that data is stored in the corresponding buffer.

Subsequently, the CPU 206 sends the address of the internal data 902 of the descriptor block 901-i (i.e., the address of the buffer 903-i storing no data) to the CPU 105. The CPU 105 determines the location of the buffer 903-i in the RAM 103b based on the received address and copies the generated packets into the buffer 903-i. After completing the copying, the CPU 105 sends the values of the data length and the flag (indicating that data is stored) of the copied packets to the CPU 206.

The CPU 206 sets the value of the data length and flag as the internal data 902 of the descriptor block 901-i in accordance with values of the data length and flag sent from the CPU 105 and then sends a transmission instruction to the LAN controller 203.

When the LAN controller 203 receives a transmission instruction, it refers to the flags of the internal data 902 of descriptor blocks 901-0 to 901-n and searches for a descriptor block 901-i ($0 \leq i \leq n$) indicating that a transmission packet is present in the corresponding buffer (i.e., searches for an ON flag). Subsequently, the LAN controller 203 determines the location of the packet based on the values of the address and data length stored in the internal data 902 of the descriptor block 901-i. Then the LAN controller 203 reads out the packet having a data length matching the value of the data length stored in the internal data 902 of the descriptor block 901-i from the corresponding buffer. The read out packet is converted into an electronic signal and is transmitted through the network 600. After transmission of the packet is completed, the LAN controller 203 clears the flag stored in the internal data 902 of the descriptor block 901-i and completes the process.

The reception process of the network apparatus 1000 will now be described with reference to FIG. 3. The packet generated from an electrical signal received through the network 600 by the LAN controller 203 is stored in one of reception normal buffers 1003-0 to 1003-i in the RAM 103b or one of the reception sleep buffers 1004-0 to 1004-n in RAM 202b. In the case of normal operation mode, the LAN controller 203 carries out DMA transfer to store the received packet in one of the reception normal buffers 1003-0 to 1003-n. In this way, the packet can be transferred from the LAN controller 203 to the reception normal buffer in the data processing device 100 without burdening the CPU 105. In the case of sleep mode, the CPU 206 stores the packet received by the LAN controller 203 in one of the reception sleep buffers 1004-0 to 1004-n in the I/O processing device 200.

When storing the generated packet in a buffer, the LAN controller 203 first refers to flags of the internal data 1002 of the descriptor blocks 1001-0 to 1001-n and the CPU 206 receives the request and refers to the flags of the internal data 1002 of the descriptor blocks 1001-0 to 1001-n and searches for a descriptor block 1001-i ($0 \leq i \leq n$) not storing any data. Here, an OFF flag indicates that no data is stored in the corresponding buffer and an ON flag indicates that data is stored in the corresponding buffer.

Subsequently, the LAN controller 203 refers to an operation-mode flag (not shown in the drawing) in the LAN controller 203 indicating the present operation mode (i.e., normal or sleep mode) of the network apparatus 1000 to determine which buffers are being used.

If the operation-mode flag indicates that the present mode is a normal operation mode, the normal buffers are used to store the packet. Thus, the LAN controller 203 determines the location of the normal buffer 1003-i in the RAM 103b based on the address 1 included in the internal data 1002 of the descriptor block 1001-i (i.e., the address of the buffer 1003-i storing no data) and copies the generated packet into the normal buffer 1003-i. To store the received packet in the normal buffer 1003-i, the LAN controller 203 carries out DMA transfer. In this way, the packet can be transferred from the LAN controller 203 to the normal buffer in the data processing device 100 without burdening the CPU 105.

If the operation-mode flag indicates that the present mode is a sleep mode, the sleep buffers are used to store the packet. Thus, the LAN controller 203 determines the location of the sleep buffer 1004-i in the RAM 202b based on the address 2 included in the internal data 1002 of the descriptor block 1001-i (i.e., the address of the buffer 1004-i storing no data) and copies the generated packet into the sleep buffer 1004-i. To store the received packet in one of the reception sleep buffers 1004-0 to 1004-n in the I/O processing device 200, the CPU 206 stores the packet received by the LAN controller 203.

After copying is complete, the LAN controller 203 sets the value of the data length and flag of the internal data 1002 of the descriptor block 1001-i in accordance with values of the data length and flag of the copied packet and then notifies the CPU 206 carrying out the processing of the network driver 201 that reception of the packet has been completed.

Then, the CPU 206 sends a request to the LAN controller 203 to refer to the operation-mode flag in the LAN controller 203 to determine whether or not the current operation mode of the network apparatus 1000 is a normal operation mode or a sleep mode.

When the network apparatus 1000 is in a normal operation mode, the CPU 206 carrying out the processing of the network driver 201 notifies the CPU 105 carrying out the processing of the network driver 102 that the reception of packets has been completed. Subsequently, the CPU 105 determines whether a packet is stored in the normal buffers 1003-0 to 1003-n. If a packet is stored, the CPU 105 obtains information on the normal buffer storing the packet, and processes the packets.

If the network apparatus 1000 in a sleep mode, the CPU 206 determines whether the received packet stored in the sleep buffer 1004-i is a predetermined packet for changing the operation mode of the network apparatus 1000 to a normal operation mode. If the packet is the predetermined packet, the CPU 206 sends a request to the power controller 205 to change the operation mode to a normal operation mode. The power controller 205 that received the request to change the operation mode to a normal operation mode restores the power supplies to the data processing device 100 and the bus 500 that were stopped in the sleep mode. Subsequently, the CPU 105 requests the CPU 206 to determine whether a packet is stored in the sleep buffers 1004-0 to 1004-n. If a packet is stored, the CPU 105 obtains information on the normal buffer storing the packet from the CPU 206, and processes the packet.

If the received packet stored in the sleep buffer 1004-i is not a predetermined packet for changing the operation mode to a normal operation mode, but is a packet for confirming whether the network apparatus 1000 is in a sleep mode, the CPU 206 sends out a packet indicating whether the network apparatus 1000 is in a sleep mode from the LAN controller 203.

Next, the process of the network apparatus 1000 entering a sleep mode and switching the reception buffer from the normal buffers 1003-0 to 1003-i to the sleep buffers 1004-0 to 1004-n will be described below.

Figure 4:
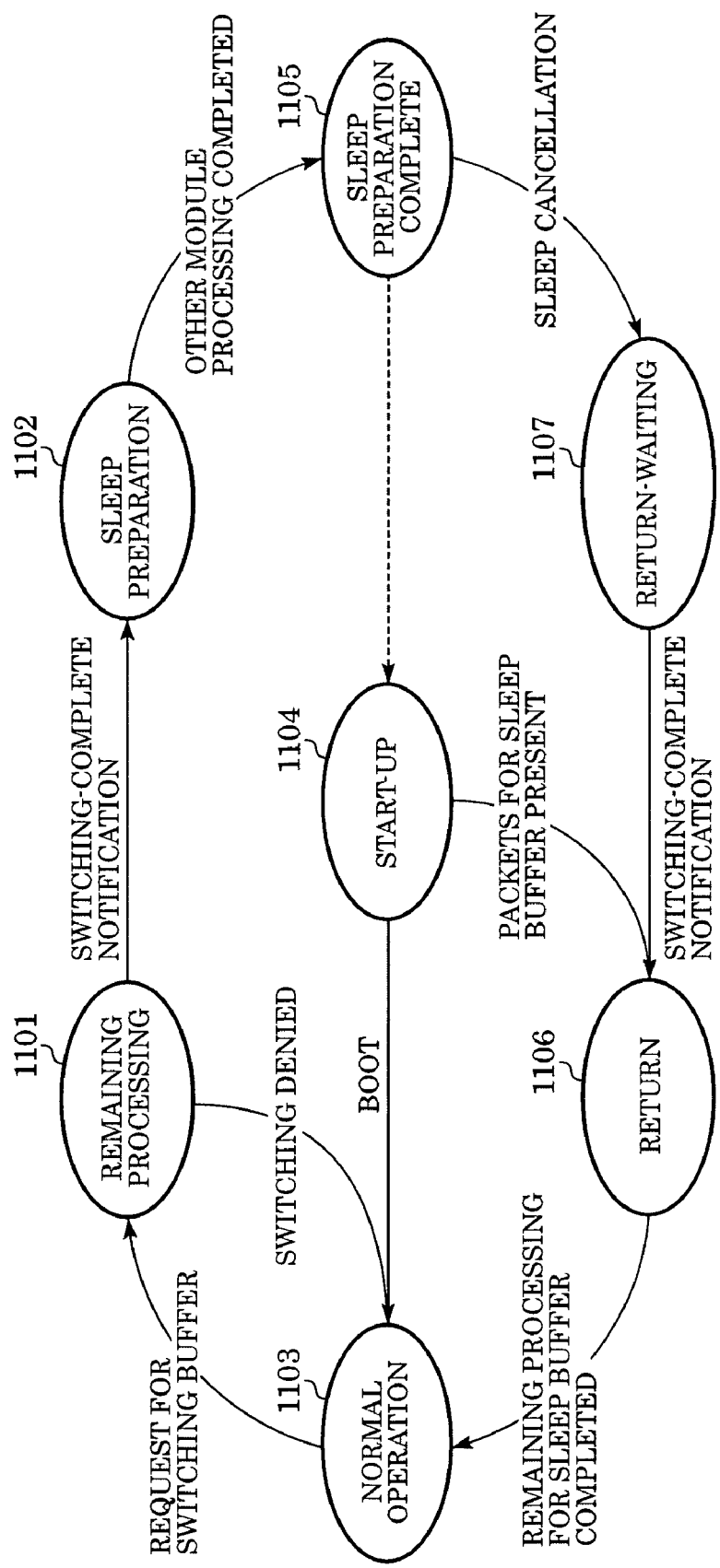
FIG. 4 is a state-transition diagram of a data processing device according to an embodiment of the present invention.
Figure 6:
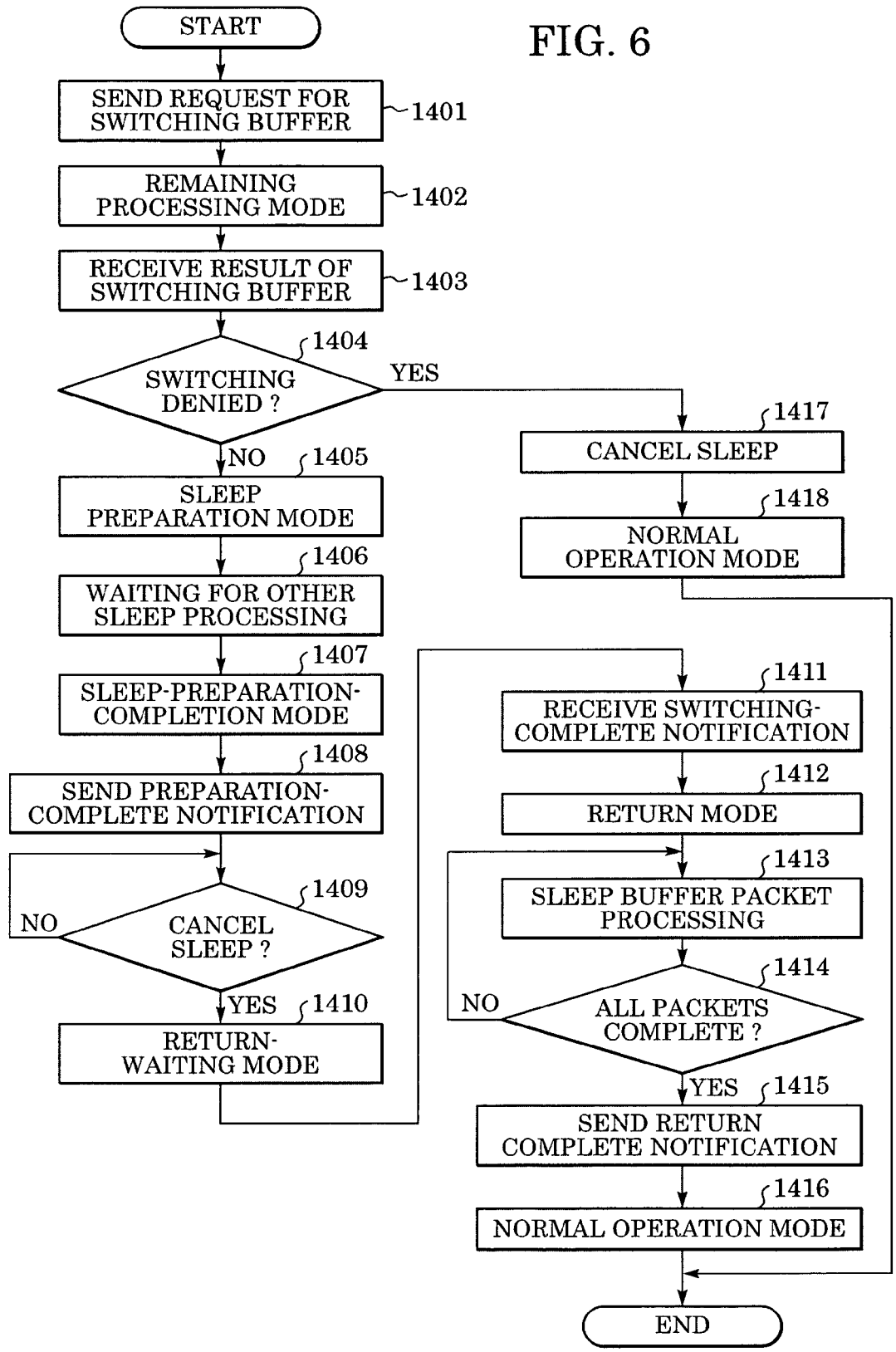
FIG. 6 is a flow chart illustrating the process for changing the operation mode of a data processing device according to an embodiment of the present invention.

The process carried out by the data processing device 100 will now be described with reference to FIGS. 4 and 6. FIG. 4 is a state-transition diagram of the data processing device 100, and FIG. 6 is a flow chart illustrating the process for switching the operation mode of the data processing device 100.

If the CPU 105 of the data processing device 100 is initially in normal operation, the CPU 105 is operating in a normal operation mode 1103 in accordance with the processing of the network driver 102. In this case, the CPU 105 determines whether a packet is present in any of the normal buffers 1003-0 to 1003-n, and then, if a packet is present, obtains information on the normal buffer storing a packet and processes the information. At this time, the CPU 105 starts the process of the network driver 102, illustrated in FIG. 6, if the CPU 105 detects that an application program of the network apparatus 1000 had sent out an instruction to switch to a sleep mode. The CPU 105 transmits a request for switching from the normal buffers to the sleep buffers to the CPU 206 carrying out the process of the network driver 201 (Step 1401) and then proceeds to a remaining-processing mode 1101 (Step 1402).

The CPU 105 receives the result of the switching of the buffers from the CPU 206 carrying out the processing of the network driver 201 (Step 1403) and determines the result (Step 1404). More specifically, the CPU 206 determines whether a packet to be transmitted to the network (LAN) 600 is present in the LAN controller 203 or if a packet has been received from the network (LAN) 600. If a packet to be transmitted or received is present in the LAN controller 203, the CPU 206 determines whether the process related to the packet can be carried out in a sleep mode. For instance, the CPU 206 determines whether the packet is, for example, a packet including print data or a packet instructing the cancellation of the sleep mode, as described below.

If the packet cannot be processed in the sleep mode for example, if the packet is a packet including print data or a packet instructing the cancellation of the sleep mode, the CPU 206 determines that the operation mode cannot be changed and notifies the CPU 105 that the operation mode cannot be changed. If the CPU 105 is notified that the operation mode cannot be changed (Step 1404→Step 1417), the CPU 105 carries out processing for canceling the sleep operation (Step 1417) and enters the normal operation mode 1103 to return to the previous operation (Step 1418). If a packet to be transmitted or received is not present in the LAN controller 203 or if the process related to the packet can be carried out in a sleep mode, for instance, if the packet is a packet for confirming whether the network apparatus 1000 is in a sleep mode or a packet for responding to a confirmation that the network apparatus 1000 is in a sleep mode, the CPU 206 determines that the operation mode can be changed and notifies the CPU 105 that the operation mode can be changed. If the operation mode can be changed (Step 1404→Step 1405), the CPU 105 proceeds to a sleep-preparation mode 1102 (Step 1405) and waits for the sleep process for other modules in the data processing device 100 to be completed (Step 1406). Since the CPU 105 provides such processes, all packets are received without failure when the operation mode is changed from a normal operation mode to a sleep mode.

After the sleep process for the other modules in the data processing device 100 is completed, the CPU 105 proceeds to a sleep-preparation completion mode 1105 (Step 1407) and notifies the CPU 206 carrying out the processing of the network driver 201 that the sleep preparation has been completed (Step 1408). The CPU 105 waits to be notified that the power has been turned off or that the sleep mode has been canceled (loop processing in Step 1409).

Since the power controller 205 that has received an instruction from the CPU 206 stops supplying power to the data processing device 100, the CPU 105 usually ends the process after Step 1409 and completes the processing of the data processing device 100 (this step is not illustrated in the drawing). In other words, power of the data processing device 100 is turned off and the network apparatus 1000 enters a sleep mode.

Figure 8:
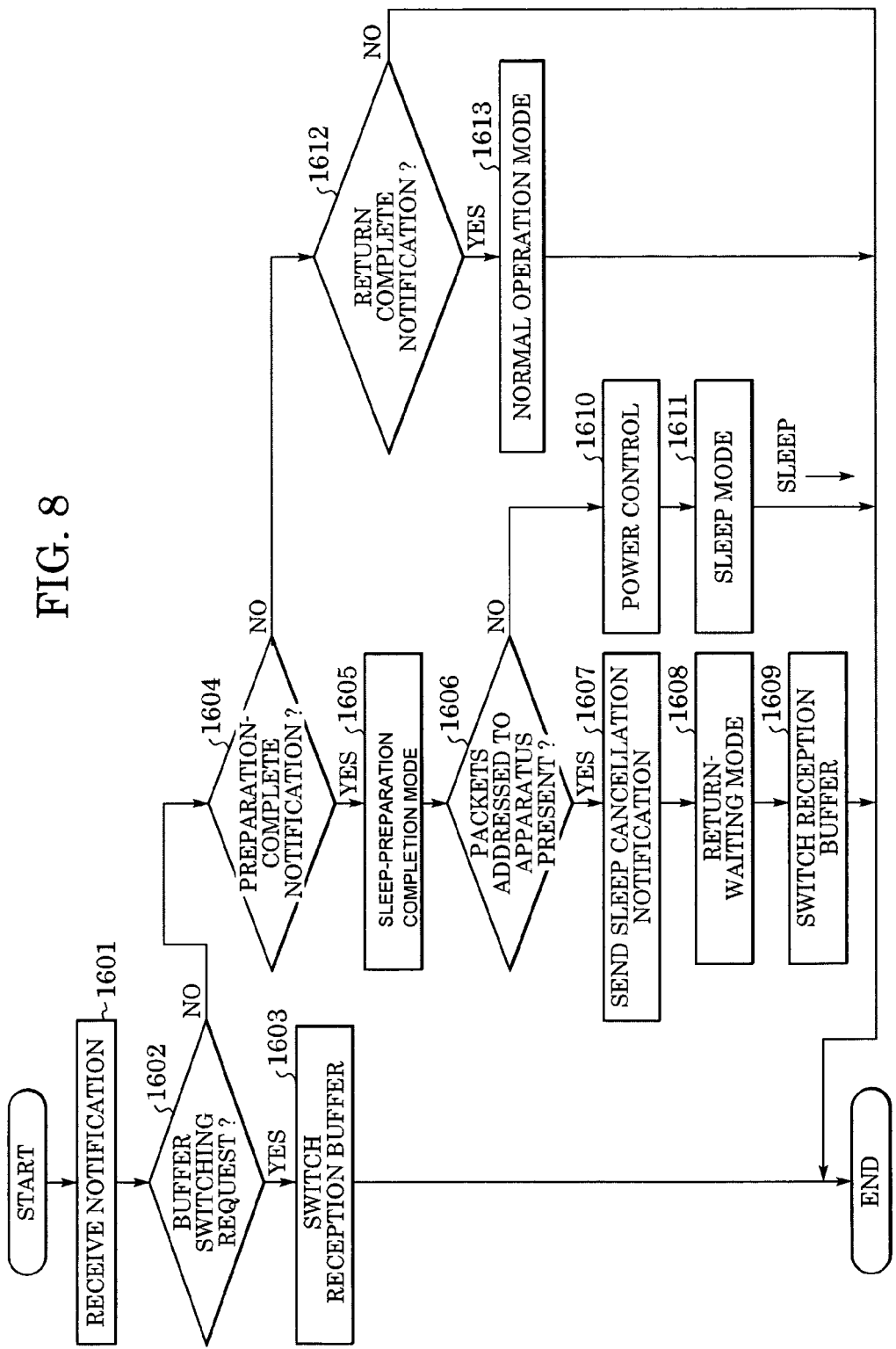
FIG. 8 is a flow chart illustrating the process for changing the operation mode of an input/output processing device according to an embodiment of the present invention.

When a sleep cancellation notification is sent from the CPU 206 carrying out the processing of the network driver 201 in Step 1607 of FIG. 8, (e.g., if the LAN controller 203 is not capable of carrying out the process related to the received packet in a sleep mode) (Step 1409 →Step 1410), the CPU 105 proceeds to a return-waiting mode 1107 and waits to be notified from the CPU 206 that the process of changing the operation mode has been completed (Step 1411). After being notified that the process for changing the operation mode has been completed, the CPU 105 proceeds to a return mode 1106 (Step 1412).

Subsequently, the CPU 105 requests the CPU 206 to determine whether a packet is present in any of the sleep buffers 1004-0 to 1004-n. The CPU 105 obtains information on the sleep buffer storing a packet from the CPU 206 (Steps 1413 and 1414). After the processing for the other packets stored in the sleep buffers is completed, the CPU 105 notifies the CPU 206 carrying out the processing of the network driver 201 that return has been completed (Step 1415) and enters the normal operation mode 1103 to return to normal operation (Step 1416). Since the CPU 105 provides such control, all packets are received without failure when the operation mode is switched from a sleep mode to a normal operation mode.

As illustrated in FIG. 4, while the network apparatus 1000 is in a sleep mode, if the power controller 205 supplies power to the data processing device 100, the CPU 105 detects that the power has been turned on and enters a start-up mode 1104 to initialize the data processing device 100. Subsequently, the CPU 105 requests the CPU 206 to determine whether a packet is present in any of the sleep buffers 1004-0 to 1004-n. If a packet is present, the CPU 105 enters the return mode 1106. Since the CPU 105 provides such control, all packets are received without failure when the operation mode is switched from a sleep mode to a normal operation mode. If a packet is not present in the sleep buffers 1004-0 to 1004-n, the CPU 105 enters the normal operation mode 1103 and returns to normal operation.

Figure 5:
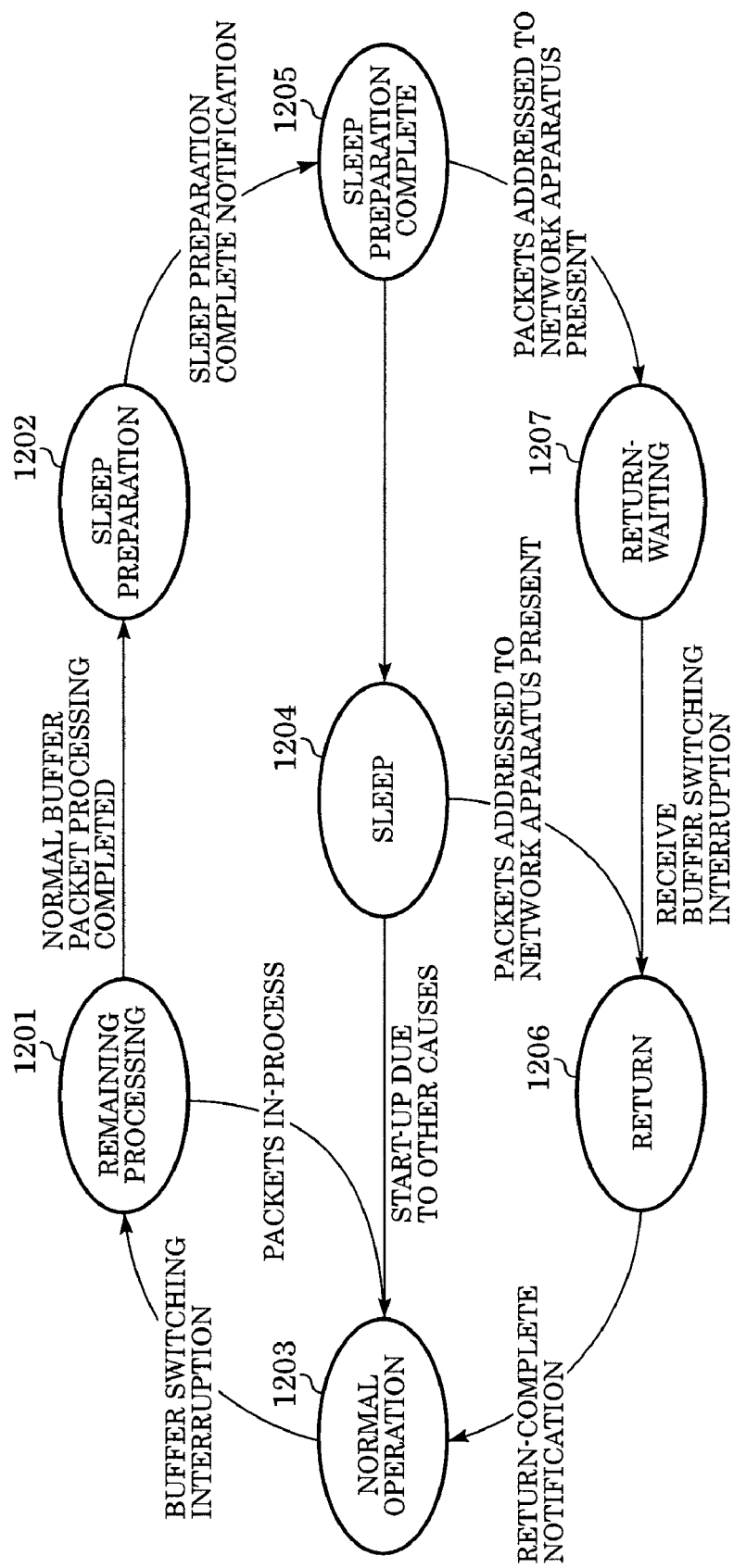
FIG. 5 is a state-transition diagram of an input/output processing device according to an embodiment of the present invention.
Figure 7:
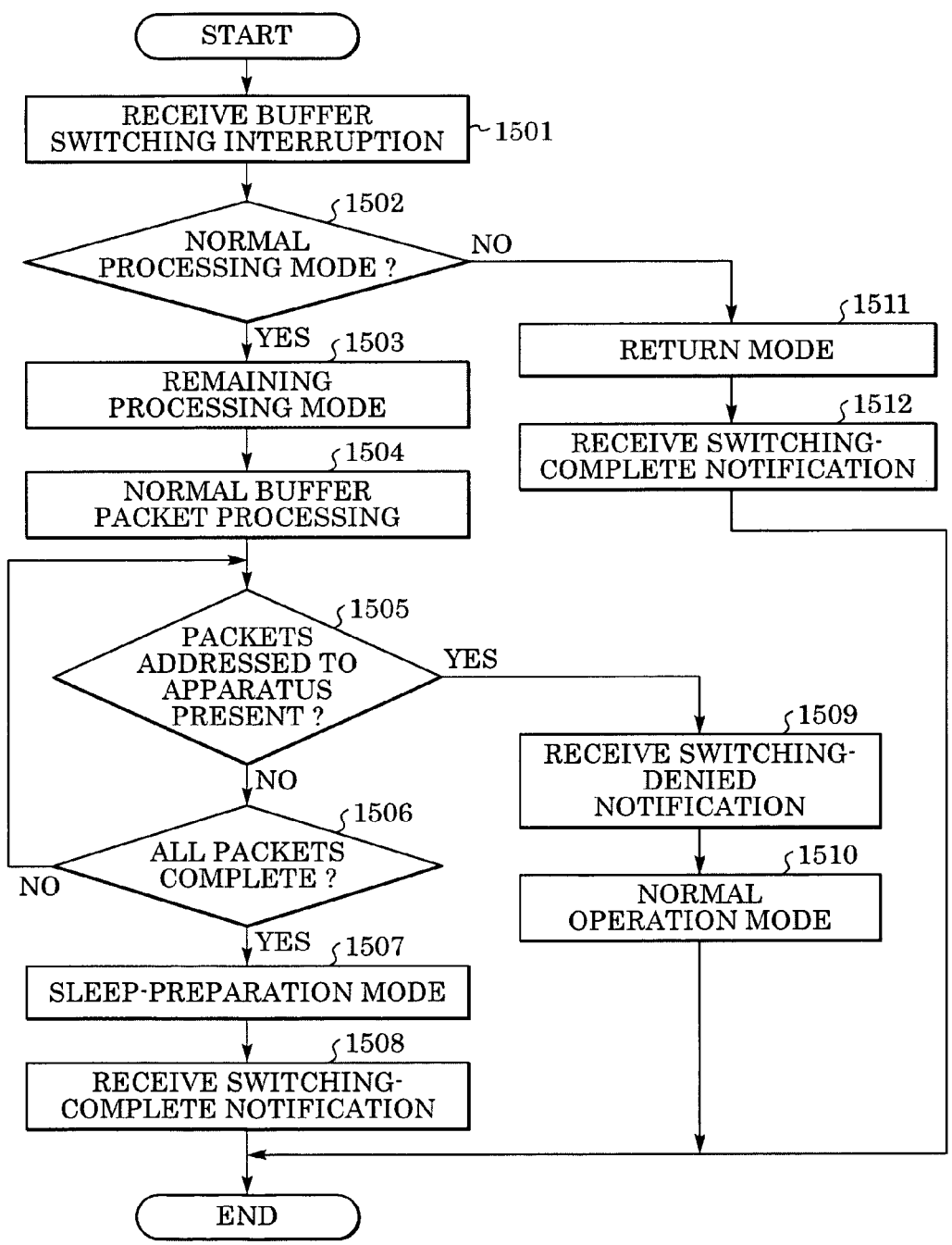
FIG. 7 is a flow chart illustrating the process for changing the operation mode of an input/output processing device according to an embodiment of the present invention.

Next, the processing of the I/O processing device 200 will be described with reference to FIGS. 5, 7, and 8. FIG. 5 is a state-transition diagram of the I/O processing device 200, and FIGS. 7 and 8 are flow charts illustrating the process for changing the operation mode of the input/output processing device 200.

In general, there two types of processing carried out by CPU 206 of the I/O processing device 200. One type of processing, illustrated in FIG. 7, is triggered when the LAN controller 203 interrupts the CPU 206. The other type of processing, illustrated in FIG. 8, is triggered when an instruction is received from the CPU 105 carrying out the processing of the network driver 102 of the data processing device 100.

The operation of the CPU 206 is triggered when a request for switching the buffers is sent from the CPU 105, in Step 1401 of FIG. 6, of the data processing device 100. At this time, the operation of the CPU 206 is in a normal operation mode 1203, which is the same operation mode as the data processing device 100.

First, the CPU 206 receives an instruction in Step 1601 of FIG. 8, and determines that the received instruction is a request for switching the buffers (Step 1602). In Step 1603, the CPU 206 instructs the LAN controller 203 to change its setting so as to indicate that the sleep buffers are in use. Then, after receiving the instruction, the LAN controller 203 sets the above-mentioned operation-mode flag in the LAN controller 203 to a sleep operation mode and sets the sleep buffers as the reception buffers.

After the setting for the reception buffers of the LAN controller 203 is changed, a buffer-switching interruption is sent from the LAN controller 203 to the CPU 206 carrying out the processing of the network driver 201. Upon receipt of the interruption, the CPU 206 proceeds to Step 1501 of FIG. 7 to carry out the interruption process. The CPU 206 first operates in the normal operation mode 1203 (Step 1502→Step 1503) and then switches to a remaining-processing mode 1201 (Step 1503). Since the CPU 105 provides such control, all packets are received without failure when the operation mode is changed from a normal operation mode to a sleep mode.

Subsequently, the CPU 206 requests the CPU 105 to determine whether a packet addressed to the network apparatus 1000 is present in any of the normal buffers 1003-0 to 1003-n. Then the information on the packet addressed to the network apparatus 1000 is obtained and determined by the CPU 206 (Step 1504→Step 1505). If a packet addressed to the network apparatus 1000 is present in any of the normal buffers, the CPU 206 cancels the sleep process by notifying the CPU 105 that the operation mode cannot be changed (Step 1509). Then, the CPU 206 completes the interruption process by entering the normal operation mode 1203 (Step 1510). On the other hand, if a packet addressed to the network apparatus 1000 is not present in any of the normal buffers (Step 1505→Step 1506→Step 1507), the CPU 206 enters a sleep-preparation mode 1202 (Step 1507) and notifies the CPU 105 that the switching of the operation mode has been completed (Step 1508). Since the CPU 206 provides such control, all packets are received without failure when the operation mode is changed from a normal operation mode to a sleep mode.

In Step 1505, a predetermined packet, for example, a packet for print data or a packet indicating the cancellation of sleep operation, as described below, cannot be processed while in a sleep mode. If the packet cannot be processed in a sleep mode, it is determined that the operation mode cannot be changed and the process proceeds to Step 1509. If the predetermined packet, for example, a packet for querying whether or not the network apparatus 1000 is in a sleep mode or a packet notifying, in response to the querying packet that the network apparatus 1000 is in a sleep mode, can be processed in a sleep mode, the process proceeds to Step 1601 of FIG. 8. In this way, the operation mode is switched from a sleep mode to a normal operation mode only when the received predetermined packet cannot be processed in a sleep mode. Consequently, power consumption is minimized for the network apparatus 1000.

Returning to FIG. 8, the CPU 102 carrying out the processing of the network driver 102 notifies the CPU 206 that preparation for sleep operation has been completed (Step 1601→Step 1602→Step 1604), and the CPU 206 enters a sleep-preparation-completion mode 1205 (Step 1605). The CPU 206 refers to flags in the internal data 1002 of the descriptor blocks 1001-0 to 1001-n (where, an OFF flag indicates that no data is stored in the corresponding buffer and an ON flag indicates that data is stored in the corresponding buffer) and determines whether a packet directed to the I/O processing device 200 has been received after the buffers have been switched to the sleep buffers (Step 1606).

If a predetermined packet, for example, a packet for determining whether processing related to a packet can be carried out in a sleep mode, addressed to the I/O processing device 200 is not present in any of the sleep buffers (Step 1606→Step 1610), the CPU 206 requests the power controller 205 to stop the power supplied to the data processing device 100 and the bus 500 (Step 1610). Then the CPU 206 enters a sleep mode 1204 and completes the process for receiving the notification (Step 1611).

If a predetermined packet, for example, a packet for determining whether processing related to a packet can be carried out in a sleep mode, addressed to the I/O processing device 200 is present in any of the sleep buffers (Step 1606→Step 1607), the CPU 206 notifies the CPU 105 carrying out the processing of the network driver 102 to cancel the sleep operation (Step 1607). After entering a return-waiting mode 1207 (Step 1608), the CPU 206 instructs the LAN controller 203 to change the reception buffers to the normal buffers. The LAN controller 203 that has received the instruction sets the operation-mode flag in the LAN controller 203 to indicate a normal operation mode, returns to the initial setting in which the normal buffers are set as the reception buffers, and then completes the process for receiving the notification (Step 1609). When switching the buffers, the CPU 105 carries out Step 1413 of FIG. 6 to process the packet in the sleep buffers. Since the CPU 105 provides such control, all packets are received without failure when the operation mode is changed from a sleep mode to a normal operation mode.

In the above described process, a packet was determined if it was a predetermined packet addressed to the I/O processing device 200. However, instead, the packet may simply be determined if it is addressed to the I/O processing device 200. If a packet addressed to the I/O processing device 200 is present, the process proceeds to Step 1607, and if a packet addressed to the I/O processing device 200 is not present, the process proceeds to Step 1610. In this way, the structure of the I/O processing device 200 can be simplified.

After the setting for the reception buffers in the LAN controller 203 is restored, a buffer-switching interruption is sent from the LAN controller 203 to the CPU 206 carrying out the processing of the network driver 201. After the CPU 206 receives the buffer-switching interruption (Step 1501), the operation mode is changed from a return-waiting mode 1207 to a return mode 1206 (Step 1511). Then, the CPU 105 is notified that the switching of the operation mode has been completed (Step 1512).

Subsequently, the CPU 105 carrying out the processing of the network driver 102 notifies the CPU 206 that the return has been completed. After the CPU 206 receives this notification (Step 1601→Step 1602→Step 1604→Step 1612), the CPU 206 enters the normal operation mode 1203 and returns to normal operation (Step 1613).

As illustrated in FIG. 5, if the LAN controller 203 detects a packet that cannot be processed in a sleep mode, such as a packet related to the start up of an internal timer, the operation related to a predetermined switch pressed by a user, the reception of a predetermined packet, or the calling up of a facsimile program (hereinafter, this packet is referred to as a "predetermined packet") when the network apparatus 1000 is in sleep operation or, in other words, the CPU 206 is in the sleep mode 1204, the LAN controller 203 notifies the CPU 206 that a predetermined packet has been detected. When the CPU 206 is notified that a predetermined packet has been detected, the CPU 206 instructs the power controller 205 to return to a normal operation mode. After the power controller 205 receives this instruction, the power controller 205 restores the power supplied to the data processing device 100 and the bus 500, which were terminated during sleep operation.

When the predetermined packet is addressed to the I/O processing device 200, the CPU 206 instructs the LAN controller 203 to change the reception buffers to the normal buffers. After receiving this instruction, the LAN controller 203 sets the operation-mode flag in the LAN controller 203 to a normal operation mode and changes the reception buffers back to the normal buffers. Then, the CPU 206 enters the return mode 1206. If the predetermined packet is not addressed to the I/O processing device 200, the CPU 206 returns to normal operation by entering the normal operation mode 1203.

Other Embodiments

In addition to the above-described embodiment, the following embodiments are also included in the present invention.

A network apparatus capable of operating various devices to realize the functions according to the first embodiment by supplying a program code of software for providing the functions according to the first embodiment to a computer (CPU or micro processing unit (MPU)) included in an apparatus or a system connected to the various devices is also included in the scope of the present invention.

Since the functions according to the first embodiment is realized by the above-mentioned program code, the above-mentioned program code and the means for supplying the above-mentioned program code to a computer, for example, a recording medium for storing the program code, are included in the scope of the present invention.

The recording medium for storing the above-mentioned program code, such as a floppy disk, a hard disk, an optical disk, a magneto-optic disk, a compact disc, a magnetic tape, a non-volatile memory card, or a ROM, is also included in the scope of the present invention.

By executing the program code supplied to the computer, the functions according to the first embodiment are realized. The program code is included in the scope of the present invention also when the program code realizes the functions according to the first embodiment by working cooperatively with on operating system (OS) operating on the computer or with other application programs.

Also, when the functions according to the first embodiment realized by processing the above-mentioned program code stored in a memory included in an expansion board of a computer or an expansion unit connected to a computer by a CPU included in the expansion board or expansion unit, the program code is included in the scope of the present invention.

In addition to the above-described embodiments, other variations of the above-described embodiments are possible. These variations will be included in the scope of the present invention so long as these variations are based on the technological idea of the present invention.

As described above, the network apparatus according to an embodiment of the present invention is capable of switching between buffers for sleep operation and normal operation. In normal operation, high-speed packet processing can be carried out. In sleep operation, in addition to normal operation, data can be received and, thus, packets are received without failure even when the operation mode is being changed.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-072702 filed Mar. 15, 2004, which is hereby incorporated by reference herein.

What is claimed is:

1. A network apparatus connected to a communication network and capable of switching between a first operation mode and a second operation mode for receiving data from the communication network, the network apparatus comprising:
   a data processing device;
   a data input processing device; and
   a power supply control device adapted to supply power to the data processing device and the data input processing device in the first operation mode, and to supply power to the data input processing device in the second operation mode,
   the data processing device comprising:
      a first storage unit adapted to store the data received from the communication network; and
      a first controlling unit adapted to control the data processing device; and
   the data input processing device comprising:
      a second storage unit adapted to store the data received from the communication network;
      a second controlling unit adapted to control the data input processing device; and
      a communication unit adapted to receive data from the communication network, to store the data in the first storage unit in the first operation mode, and to store the data in the second storage unit in the second operation mode,
   wherein the network apparatus inhibits the switching from the first operation mode to the second operation mode if data is stored in the first or second storage unit and the stored data is predetermined data for use in carrying out a process that is unable to be carried out in the second operation mode.

2. The network apparatus according to claim 1, wherein the second controlling unit further comprises:
   a determining unit adapted to determine whether data is stored in the first or second storage unit and the stored data can be processed in the second operation mode;

a notifying unit adapted to notify the inhibition of the switching from the first operation mode to the second operation mode if the determining unit determines that data is stored in the first or second storage unit and the stored data cannot be processed in the second operation mode; and a first inhibiting unit adapted to inhibit the switching from the first operation mode to the second operation mode if the determining unit determines that data is stored in the first or second storage unit and the stored data cannot be processed in the second operation mode; and wherein the first controlling unit further comprises:

a receiving unit adapted to receive the inhibition notification from the notifying unit that the switching from the first operation mode to the second operation mode is inhibited by the first inhibiting unit;

a second inhibiting unit adapted to inhibit the switching from the first operation mode to the second operation mode if the receiving unit receives the inhibition notification; and a storage data processor adapted to process the data stored in the first or second storage unit in accordance with the inhibition by the second inhibiting unit.

3. The network apparatus according to claim 1, wherein the data input processing device further comprises a data communication unit adapted to communicate with the data processing device.

4. The network apparatus according to claim 1, wherein the data received from the communication network is a predetermined packet addressed to the network apparatus.

5. The network apparatus according to claim 1,
wherein the network apparatus inhibits the switching from the first operation mode to the second operation mode if data is stored in the first storage unit and the stored data is predetermined data for use in carrying out a process that is unable to be carried out in the second operation mode.

6. The network apparatus according to claim 1,
wherein the predetermined data cannot be processed in the second operation mode.

7. A method for controlling a network apparatus connected to a communication network and capable of switching between a first operation mode and a second operation mode for receiving data from the communication network, the network apparatus comprising: a data processing device; a data input processing device; and a power supply control device adapted to supply power to the data processing device and the data input processing device in the first operation mode and to supply power to the data input processing device in the second operation mode, the data processing device comprising: a first storage unit adapted to store the data received from the communication network; and a first controlling unit adapted to control the data processing device; and the data input processing device comprising: a second storage unit adapted to store the data received from the communication network; a second controlling unit adapted to control the data input processing device; and a communication unit adapted to receive data from the communication network, to store the data in the first storage unit in the first operation mode, and to store the data in the second storage unit in the second operation mode, the method comprising:

storing the data received from the communication network in the first storage unit in the first operation mode;

storing the data received from the communication network in the second storage unit in the second operation mode; and inhibiting the switching from the first operation mode to the second operation mode if data is stored in the first or second storage unit and the stored data is predetermined data for use in carrying out a process that is unable to be carried out in the second operation mode.

8. The method for controlling the network apparatus according to claim 7,
wherein the switching from the first operation mode to the second operation mode is inhibited if data is stored in the first storage unit and the stored data is predetermined data for use in carrying out a process that is unable to be carried out in the second operation mode.

9. The method for controlling the network apparatus according to claim 7,
wherein the predetermined data cannot be processed in the second operation mode.

10. A computer readable storage medium embodying a computer executable program of a method for controlling a network apparatus connected to a communication network and capable of switching between a first operation mode and a second operation mode for receiving data from the communication network, the network apparatus comprising: a data processing device; a data input processing device; and a power supply control device adapted to supply power to the data processing device and the data input processing device in the first operation mode and to supply power to the data input processing device in the second operation mode, the data processing device comprising: a first storage unit adapted to store the data received from the communication network; and a first controlling unit adapted to control the data processing device; and the data input processing device comprising: a second storage unit adapted to store the data received from the communication network; a second controlling unit adapted to control the data input processing device; and a communication unit adapted to receive data from the communication network, to store the data in the first storage unit in the first operation mode, and to store the data in the second storage unit in the second operation mode, the method comprising:

storing the data received from the communication network in the first storage unit in the first operation mode;

storing the data received from the communication network in the second storage unit in the second operation mode; and inhibiting the switching from the first operation mode to the second operation mode if data is stored in the first or second storage unit and the stored data is predetermined data for use in carrying out a process that is unable to be carried out in the second operation mode.

* * * * *